United States Patent Office 3,597,169
Patented Aug. 3, 1971

3,597,169
PROCESS FOR DEMETHANIZATION OF LIQUID OXYGEN
David W. Savage, Atlanta, Ga., assignor to Esso Research and Engineering Company
No Drawing. Filed Nov. 13, 1968, Ser. No. 775,513
Int. Cl. B01d 15/00
U.S. Cl. 23—312
6 Claims

ABSTRACT OF THE DISCLOSURE

The disclosure is directed to an improved process for the removal of methane from a mixture of methane and oxygen by the use of an X-type zeolite catalyst. The use of silver and calcium cation-exchanged forms of synthetic X zeolites result in a much higher capacity for methane removal than was heretofore possible under the prior art.

BACKGROUND OF THE INVENTION

In many applications which make use of oxygen, it is extremely important that the oxygen be delivered essentially free of various impurities. One of the most bothersome impurities is methane, which must be removed down to concentrations of less than 10 parts per million for various uses such as in fuel cells. Also, a significant demand exists for what is designated as grade B oxygen, which is used for supplying the requirements of high altitude aviators. This grade must contain less than 25 parts per million of methane. Oxygen with over 50 p.p.m. of methane may, in fact, find no real markets.

Meeting the required specifications of liquid oxygen, i.e. methane concentrations of 25 p.p.m. or less, may be particularly troublesome in areas where there is a high methane content in the air used to produce the liquid oxygen. Any methane in the air tends to pass through standard contaminant removal absorbers and concentrates preferentially in the liquid oxygen reboilers. If no liquid oxygen is withdrawn, methane could concentrate to a dangerously high level. This requires that a minimum withdrawal of liquid oxygen always be maintained consistent with avoiding a hazardous concentration of methane in the reboiler. Depending on market demands in the local area, more liquid oxygen may have to be withdrawn than can be sold. If the air contains a high level of methane, liquid oxygen may be unsaleable, as it can contain up to 500 p.p.m. of methane.

SUMMARY OF THE INVENTION

The instant invention discloses a process making use of certain cation-exchanged forms of synthetic zeolite resins for removing methane in a liquid oxygen environment.

A preferred form of a highly efficient methane removing catalyst is obtained by cation-exchanging silver and/or calcium ions with a conventional sodium type X zeolite.

Thus, the principal object of the present invention is to provide an improved method for removing small amounts of methane from an oxygen environment. Other objects will be apparent from the subsequent disclosure and appended claims. These objects are achieved by contacting the methane containing oxygen with a crystalline zeolitic molecular sieve containing in the inner absorption region at least one material selected from the group consisting of silver, calcium, cadmium, strontium and boron. Such contact results in the preferential removal of methane from the methane/oxygen mixture whether such mixture is in gaseous or liquid form.

Zeolitic molecular sieves both natural and synthetic are metal aluminosilicates. The crystalline structure of these materials is such that a relatively large absorption area is presented inside each crystal. Access to this area may be had by way of openings or pores in the crystal. It is known that molecules are selectively absorbed by molecular sieves on the basis of their size and polarity among other things.

Zeolitic molecular sieves consist basically of three dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, metal ions, ammonium ions, hydrogen ions or amine complexes. The space between the tetrahedra may be occupied by water or other absorbate molecules. Zeolites may be activated by driving off substantially all of the water of hydration. The space remaining in the crystal after activation is available for adsorption of absorbate molecules. Any of the space not occupied will be available for absorption of molecules having a size, shape and energy which permits entry of the absorbate molecules into the pores of the molecular sieves.

The zeolitic molecular sieves to be useful in the present invention must be capable of preferentially adsorbing methane molecules as compared to the oxygen molecules making up the substantial part of the liquid or gas mixture. Included among these types of sieves are the natural-zeolitic molecular sieves, chabazite, faujasite, erionite, mordenite, gmelinite, and the calcium form of analcite, and the synthetic zeolitic molecular sieves, zeolite A, D, L, R, S, T, X and Y. The natural materials are adequately described in the chemical art. The characteristics of the synthetic materials and processes for making them are also described in the art and by way of example the following describes briefly the general formula for a particular zeolite; namely, zeolite X, and one method for its manufacture.

The general formula for zeolite X expressed in terms of mole fractions of oxides is as follows:

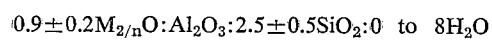

In the formula M represents a cation, for example, calcium or silver cations, and $n$ its valence. As indicated above, the zeolite is activated or made capable of adsorbing certain molecules by the removal of water from the crystal as by heating. Thus, the actual number of moles of water present in the crystal will depend upon the degree of hydration or activation of the crystal. Heating to temperatures of about 350° C. has been found sufficient to remove substantially all of the adsorbed water.

The cation represented in the formula above by the letter M can be changed by conventional ion-exchange techniques. The sodium form of the zeolite, designated sodium zeolite X, is the most convenient to manufacture, and for this reason the other forms of zeolite X are usually obtained by the modification of sodium zeolite X.

The typical formula for sodium zeolite X is:

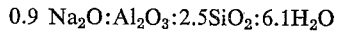

To make sodium zeolite X, reactants are mixed in aqueous solution and held at about 100° C. until the crystals of zeolite X are formed. Preferably the reactants should be such that in the solution the following ratios prevail:

SiO$_2$/Al$_2$O$_3$ — 3–5
Na$_2$O/SiO$_2$ — 1.2–1.5
H$_2$O/Na$_2$O — 35–60

The major lines in the X-ray diffraction patterns of zeolite X are set forth in Table I below:

TABLE I

| $d$ Value of reflection in A | 100 $I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques are employed. Thus, the radiation is normally K-α doublet of copper, and a Geiger counter spectrometer equipped with a strip chart pen recorder is normally used. The peak heights, I, and the positions as a function of 2$\theta$, where $\theta$ is the Bragg angle, are read from the spectrometer charge. From these, the relative intensities, 100 $I/I_0$, where $I_0$ is the intensity of the strongest line or peak, and $d(obs)$, the interplanar spacing in A. corresponding to the recorded lines, are calculated. The X-ray patterns normally indicate a cubic unit cell having dimensions varying between from about 24.5 A. to about 25.5 A.

Several methods are available for incorporating the desired cation, e.g. silver or calcium ions, in the zeolitic molecular sieves. The first of these comprises intimately contacting the zeolitic molecular sieve with an aqueous solution of a water-soluble salt of the metal to be deposited in the inner adsorption area of the zeolitic molecular sieve whereby ion-exchange of the metal cations of the zeolitic molecular sieve in the aqueous solution occurs. This contacting is followed by separating the zeolitic molecular sieve from the aqueous exchanging solution and then drying the zeolitic molecular sieve whereby substantially all of the water is removed from the sieve. After this water removal, the zeolitic molecular sieve is intimately contacted with a reducing agent such as alkali metal vapors or gaseous hydrogen whereby the cations of the metal to be deposited, e.g. calcium or silver or mixtures thereof, are reduced to the elemental metal.

In an example of this method of preparation, 2 grams of zeolite X were placed in a glass column having an inside diameter of 5 millimeters to a bed depth of 10 centimeters. The zeolite was given two successive treatments with 0.02 molar aqueous silver nitrate followed by three treatments with 0.15 molar AgNO$_3$ at 60° C. in the dark. The solutions were passed upwards through the column at a rate of 1 milliliter per minute. The zeolite was washed after completion of exchange by passing 100 milliliters of distilled water through the column, the last washing being adjusted to pH 9.5 with hydroxide to minimize any hydrolysis. The zeolite was then removed from the column and dried at 150° C., precautions being taken to shield it from bright light, as it is somewhat unstable to light. X-ray diffraction analysis of the dried product showed the crystal structure to be intact.

The silver-exchanged zeolite was placed in a tube and heated under a helium purge of 50 ml. per minute at from about 60° C. to about 450° C. for 1.5 hours until dehydrated. Chemical analysis of the product indicated 40.9 wt. percent of silver.

In another example of this method of preparation, a calcium exchanged X-zeolite was prepared as follows: 100 grams of sodium X-zeolite was placed in a glass column having an inside diameter of 16 mm. and a bed depth of 70 centimeters. The calcium form was prepared by ion exchange using 0.05 molar aqueous calcium chloride (CaCl$_2$) at 90° C. The solution was passed upwards through the column at a rate of 10 millimeters per minute. The zeolite was washed after completion of exchange by passing 6,000 milliliters of distilled water through the column. The zeolite was then removed from the column and dried at 150° C. X-ray diffraction analysis on the dried product showed the crystal structure to be intact. The zeolite was finally placed in a tubular furnace and heated to about 500° C. in 1.5 hours and cooled to room temperature in another 1.5 hours.

Another method for incorporating the metal within the zeolitic molecular sieve comprises contacting the zeolitic molecular sieve with an aqueous solution of a metal-amine, complex cation of silver or calcium, whereby ion-exchange occurs between the complex cations and the exchangeable cations of the zeolitic molecular sieve. This is followed by drying the ion-exchange zeolitic molecular sieve; activating the dried ion-exchange zeolitic molecular sieve in an inert atmosphere; reducing the complex cations in the activated zeolitic molecular sieve by heating the sieve up to a temperature of about 350° C. in a flowing stream of an inert dried gas or in vacuum, whereby the complex cation is destroyed, thereby depositing the metal in a very highly dispersed form in the inner adsorption area of the zeolitic molecular sieve. The above is followed by a cooling of the product. To achieve the highest activity, the product is further heated in hydrogen after destroying the complex action.

The process of the instant invention makes use of catalysts of the type described above by passing the methane containing oxygen through a column containing a bed composed of one or more of the catalysts in pellet form. One important advantage obtained by utilizing the process of the invention is that if the oxygen to be purified is in liquid form, there is no need to vaporize it prior to passing it through the bed. In other words the system maintains its ability to preferentially remove methane from oxygen even at the extremely low temperatures normally associated with liquid oxygen. It is to be appreciated that this ability is of extreme importance in that it saves the substantial expenses of reliquefaction.

In a preferred mode of operation, the catalytic bed referred to above is from about 4 feet to about 30 feet deep and the methane containing oxygen is passed through the bed at space velocities ranging from about 0.1 to about 20 v./v./hr., with preferred operation in the range of 0.2–5 v./v./hr. (the space velocity being in terms of volume of feed liquid/hour/empty volume of catalyst bed).

A preferred catalyst according to the teachings of the instant invention is obtained by replacing 90% or more of the sodium atoms in an X-type zeolitic structure with calcium. Such a catalyst gives surprisingly superior results both in terms of methane capacity and rate of methane removal. This is exemplified by the data presented in Table II.

TABLE II

| Catalyst designation number | Percent sodium atoms replaced by calcium | Equilibrium capacity for methane, lb. methane/ lb. adsorbent | Length of mass (inches) transfer zone |
|---|---|---|---|
| 1 | 0 | 0.0017 | >>27 |
| 2 | ~75 | 0.0025 | ~25 |
| 3 | >90 | 0.0038 | 14–15 |

In the table above, Catalyst #1 was an ordinary sodium zeolite X of the type heretofore described. This particular zeolite is available commercially under the name of Linde Molecular Sieve 13X. Catalyst #2 differs from #1 in that approximately 75% of its sodium atoms are replaced by calcium. The catalyst designated #3 was obtained by replacing more than 90% of the sodium ions in Catalyst #1 with calcium ions. This exchange was conveniently accomplished by ion-exchanging the catalyst with a $CaCl_2$ solution according to the procedure outlined hereinabove. Catalyst #3 is clearly superior to the others, both in terms of equilibrium methane capacity and rate of methane removal. The term "methane equilibrium capacity" means the maximum lb. methane/lb. adsorbent that the adsorbent will remove from a liquid oxygen feed of fixed methane content.

The high methane removal capacity and the short mass transfer zone length exhibited by Catalyst #3 makes it particularly attractive in the instant process. The mass transfer or adsorption zone is defined as that portion of the bed in which the adsorbate (methane) concentration changes from 5 to 95% of the feed concentration. The length of the mass transfer zone is measured in inches. Very short mass transfer zones correspond to high methane removal rates; long zones imply slow methane removal rates.

As hereinbefore indicated, the silver-exchanged form of sodium zeolite X is also a preferred catalyst for use in the instant process. In this regard it is to be pointed out that the silver zeolite has even greater methane removal capacity and produces even shorter mass transfer zones than the calcium zeolite. However, it is also to be appreciated that the silver zeolite tends to be unstable to light and it is inherently more expensive so that its use is somewhat restricted. While not yet fully understood, it appears that the exceptional ability of the silver substituted zeolite to preferentially remove methane in the instant application arises because it is monovalent and it has "$d$" orbitals which give rise to intense directional properties which result in the polarization of the methane molecules.

The effect of other factors, e.g. valence and its associated effect on the number of silver ions present and their positions within the zeolite lattice (i.e. exposed or screened), also undoubtedly influences the methane removal ability. On the basis of an electronic configuration similar to silver, cadmium X zeolite may also be expected to approach the behavior of silver in its ability to selectively remove methane from an oxygen/methane mixture.

While considerable detail has been given by way of description and explanation, the full scope of the invention may be had by reference to the following appended claims.

What is claimed is:

1. A process for removing methane from a liquid mixture comprising methane and oxygen which comprises contacting said mixture with a catalyst which comprises a calcium exchanged sodium zeolite X molecular sieve, in which about 75% to 90% of the sodium atoms are replaced by calcium atoms, whereby the methane is preferentially adsorbed by said molecular sieve.

2. The process of claim 1 wherein at least 90% of the sodium atoms originally present in said sodium zeolite X molecular sieve are replaced by calcium atoms.

3. The process of claim 1 wherein said liquid mixture contacts with said molecular sieve at a space velocity of 0.1 to 20 volumes of liquid mixture per hour per empty volume of catalyst bed.

4. The process of claim 1 wherein said liquid mixture contacts said molecular sieve at a space velocity of 0.2 to 5 volumes of liquid mixture per hour per empty volume of catalyst bed.

5. A process for removing methane from a liquid mixture comprising methane and oxygen which comprises contacting said mixture with a catalyst comprising a silver exchanged sodium zeolite X molecular sieve in which the weight percentage of silver is about 40.9%, whereby the methane is preferentially adsorbed by said molecular sieve.

6. The process of claim 5 wherein said liquid mixture contacts said molecular sieve at a space velocity of 0.1 to 20 volumes of liquid mixture per hour per empty volume of catalyst bed.

References Cited
UNITED STATES PATENTS

| | | | |
|---|---|---|---|
| 2,882,243 | 4/1959 | Milton | 55—75X |
| 2,882,244 | 4/1959 | Milton | 55—75X |

JAMES DE CESARE, Primary Examiner

U.S. Cl. X.R.

55—75; 210—24